United States Patent
Kim et al.

(10) Patent No.: US 10,257,734 B2
(45) Date of Patent: Apr. 9, 2019

(54) METHOD AND APPARATUS FOR INDICATING LOGGED MBMS MEASUREMENT AVAILABILITY IN WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/310,072

(22) PCT Filed: May 15, 2015

(86) PCT No.: PCT/KR2015/004899
§ 371 (c)(1),
(2) Date: Nov. 9, 2016

(87) PCT Pub. No.: WO2015/174782
PCT Pub. Date: Nov. 19, 2015

(65) Prior Publication Data
US 2017/0272968 A1    Sep. 21, 2017

Related U.S. Application Data

(60) Provisional application No. 61/994,131, filed on May 16, 2014, provisional application No. 62/000,543, filed on May 20, 2014.

(51) Int. Cl.
*H04W 4/06* (2009.01)
*H04W 4/90* (2018.01)
(Continued)

(52) U.S. Cl.
CPC .......... *H04W 24/10* (2013.01); *H04L 12/189* (2013.01); *H04W 4/06* (2013.01); *H04W 24/08* (2013.01);
(Continued)

(58) Field of Classification Search
CPC ....... H04W 24/10; H04W 24/08; H04W 4/06; H04L 12/189
See application file for complete search history.

(56) References Cited

U.S. PATENT DOCUMENTS

| 2011/0195668 A1* | 8/2011 | Lee | H04W 24/10 455/67.11 |
| 2011/0312306 A1* | 12/2011 | Wu | H04W 24/10 455/414.1 |

(Continued)

FOREIGN PATENT DOCUMENTS

| CN | 102056193 | 5/2011 |
| CN | 103686606 | 3/2014 |
| WO | 2011085238 | 7/2011 |

OTHER PUBLICATIONS

Samsung, "On supporting the logged MBMS MDT in connected mode", 3GPP TSG RAN WG2 #86, R2-142285, May 9, 2014, 3 pages.

(Continued)

*Primary Examiner* — Redentor Pasia
(74) *Attorney, Agent, or Firm* — Lee Hong Degerman Kang Waimey

(57) ABSTRACT

A method and apparatus for indicating a logged multimedia broadcast multicast service (MBMS) measurement availability in a wireless communication system is provided. A user equipment (UE) determines whether to inform a serving cell that the UE has logged MBMS measurement results to be reported based on a first condition and a second condition, and when both the first condition and the second (Continued)

condition are met, the UE informs the serving cell that the UE has the logged MBMS measurement results. The first condition corresponds to that the UE 0has the logged MBMS measurement results to be reported. The second condition includes at least one MBMS minimization of drive tests (MDT) related condition.

12 Claims, 10 Drawing Sheets

(51) Int. Cl.
    *H04L 12/18*     (2006.01)
    *H04W 24/08*     (2009.01)
    *H04W 24/10*     (2009.01)
    *H04W 48/08*     (2009.01)
    *H04W 76/27*     (2018.01)
    *H04W 88/02*     (2009.01)

(52) U.S. Cl.
    CPC .............. *H04W 48/08* (2013.01); *H04W 4/90* (2018.02); *H04W 76/27* (2018.02); *H04W 88/02* (2013.01)

(56) References Cited

U.S. PATENT DOCUMENTS

| | | | | |
|---|---|---|---|---|
| 2012/0069760 A1* | 3/2012 | Wu | ..................... | H04L 41/0813 370/252 |
| 2012/0108241 A1* | 5/2012 | Wu | ...................... | H04W 24/10 455/436 |
| 2012/0155390 A1* | 6/2012 | Ou | ........................ | H04W 24/10 370/328 |
| 2012/0329402 A1* | 12/2012 | Ren | ...................... | H04W 24/10 455/67.11 |
| 2013/0242785 A1* | 9/2013 | Guo | ...................... | H04W 24/02 370/252 |
| 2013/0315075 A1* | 11/2013 | Tamura | ................. | H04W 24/10 370/242 |
| 2014/0051429 A1 | 2/2014 | Jung et al. | | |
| 2015/0201344 A1* | 7/2015 | Wu | ......................... | H04W 4/06 370/252 |
| 2016/0212595 A1* | 7/2016 | Fukuta | ................ | H04W 76/002 |

OTHER PUBLICATIONS

CATT, "Clarification on the logging behaviors of MBMS MDT", 3GPP TSG RAN WG2 Meeting #86, R2-142386, May 9, 2014, 2 pages.

Samsung, "Introducing eMBMS measurement by extension of logged measurements", 3GPP TSG-RAN2 Meeting #85 bis, R2-141536, Mar. 21, 2014, 22 pages.

ZTE, "Enhanced DCCH for Logged MBMS MDT", 3GPP TSG-RAN WG2#86, R2-141997, May 10, 2014, 3 pages.

3rd Generation Partnership Project, "Technical Specification Group Radio Access Network; Universal Terrestrial Radio Access (UTRA) Evolved Universal Terrestrial Radio Access (E-UTRA); Radio measurement collection for Minimization of Drive Tests (MDT); Overall description; Stage 2 (Release 11)", 3GPP TS 37.320 V11. 3.0, Mar. 2013, 23 pages.

3rd Generation Partnership Project, "Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 347 pages.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.7.0, Sep. 2013, 209 pages.

State Intellectual Property Office of the People's Republic of China Application Serial No. 201580025375.6, Office Action dated Nov. 1, 2018, 7 pages.

Mediatek, "Introduction of MBMS operations support for E-UTRA", 3GPP TSG RAN WG2 Meeting #86, R2-142643, May 2014, 19 pages.

\* cited by examiner

METHOD AND APPARATUS FOR INDICATING LOGGED MBMS MEASUREMENT AVAILABILITY IN WIRELESS COMMUNICATION SYSTEM

CROSS-REFERENCE TO RELATED APPLICATIONS

This application is the National Stage filing under 35 U.S.C. 371 of International Application No. PCT/KR2015/004899, filed on May 15, 2015, which claims the benefit of U.S. Provisional Applications No. 61/994,131, filed on May 16, 2014 and 62/000,543 filed on May 20, 2014, the contents of which are all hereby incorporated by reference herein in their entirety.

BACKGROUND OF THE INVENTION

Field of the Invention

The present invention relates to wireless communications, and more particularly, to a method and apparatus for indicating logged multimedia broadcast multicast service (MBMS) measurement availability in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS). The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Minimization of drive tests (MDT) is a feature introduced in 3GPP LTE rel-10 to allow the harvesting of network coverage and quality information from customer user equipments (UEs) as they move within the coverage of the radio access network (RAN). This provides better quality data, at a lower cost, than that produced by the RAN operator performing drive testing of the RAN using test UEs.

The concept of MDT may be applied to MBMS, which may be referred to as MBMS MDT. For a UE which is interested to receive MBMS or is receiving MBMS, MBMS MDT may be configured and performed. The purpose of MBMS MDT is allowing for the network operator harvesting of network coverage and quality information from UEs related to MBMS, which means that UEs can report areas in which MBMS cannot be received without enough quality.

A method for performing MBMS MDT efficiently may be required.

SUMMARY OF THE INVENTION

The present invention provides a method and apparatus for indicating logged multimedia broadcast multicast service (MBMS) measurement availability. The present invention provides a method and apparatus for informing that a user equipment (UE) has logged MBMS measurement results to be reported when a specific condition is met.

In an aspect, a method for indicating, by a user equipment (UE), a logged multimedia broadcast multicast service (MBMS) measurement availability in a wireless communication system is provided. The method includes determining whether to inform a serving cell that the UE has logged MBMS measurement results to be reported based on a first condition and a second condition, and when both the first condition and the second condition are met, informing the serving cell that the UE has the logged MBMS measurement results. The first condition corresponds to that the UE has the logged MBMS measurement results to be reported, and the second condition includes at least one MBMS minimization of drive tests (MDT) related condition.

In another aspect, a user equipment (UE) includes a memory, a transceiver, and a processor coupled to the memory and the transceiver, and configured to determine whether to inform a serving cell that the UE has logged multimedia broadcast multicast service (MBMS) measurement results to be reported based on a first condition and a second condition, and when both the first condition and the second condition are met, control the transceiver to inform the serving cell that the UE has the logged MBMS measurement results. The first condition corresponds to that the UE has the logged MBMS measurement results to be reported, and the second condition includes at least one MBMS minimization of drive tests (MDT) related condition.

Logged MBMS measurement results can be reported not too frequently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
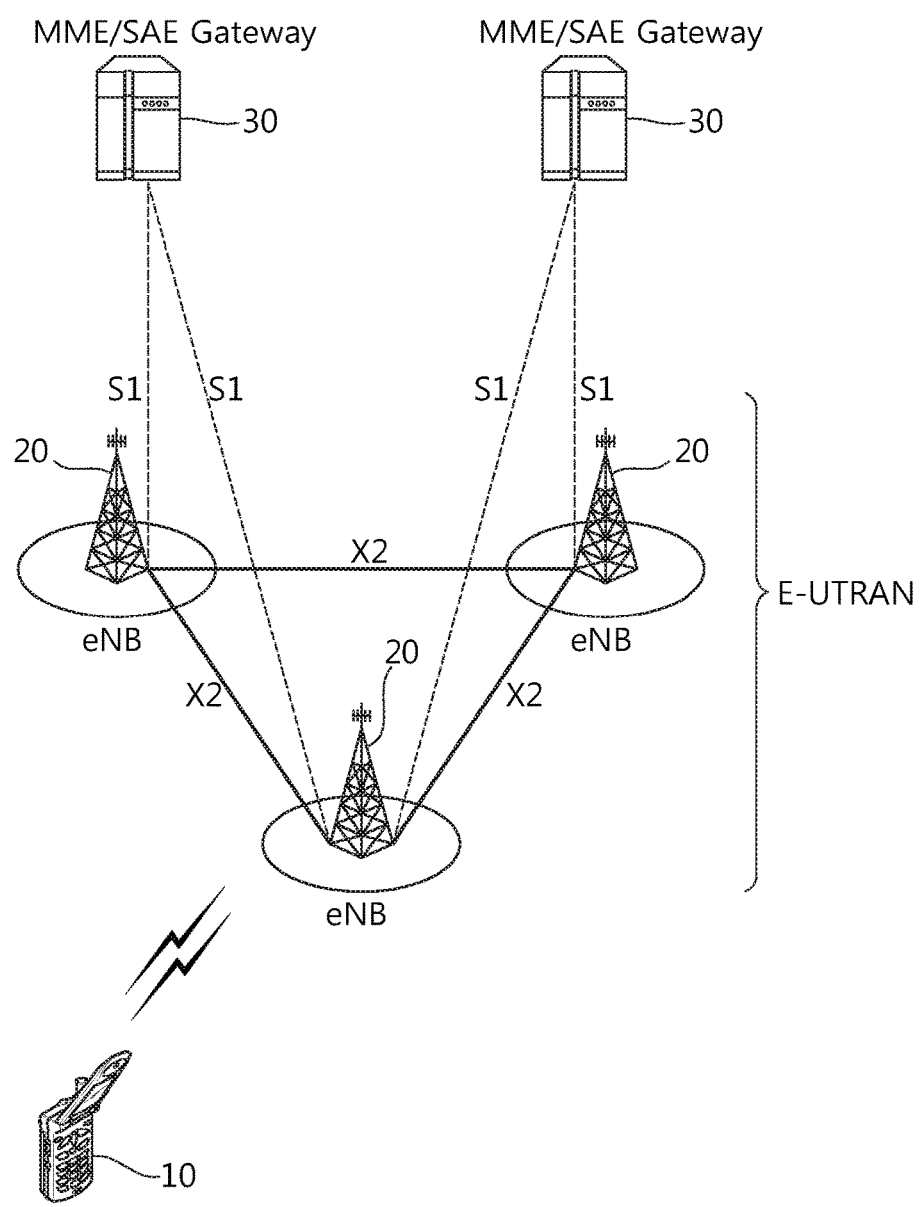
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
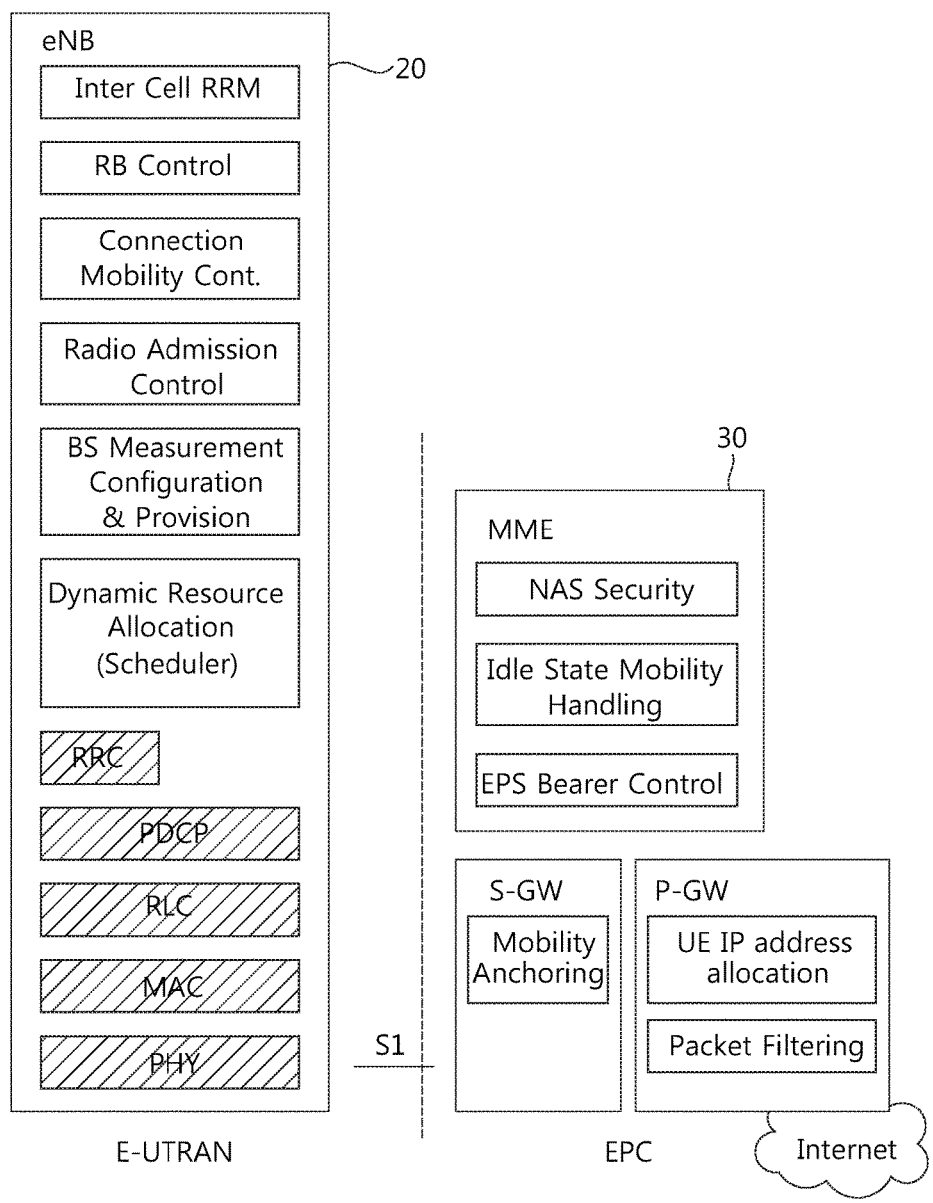
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
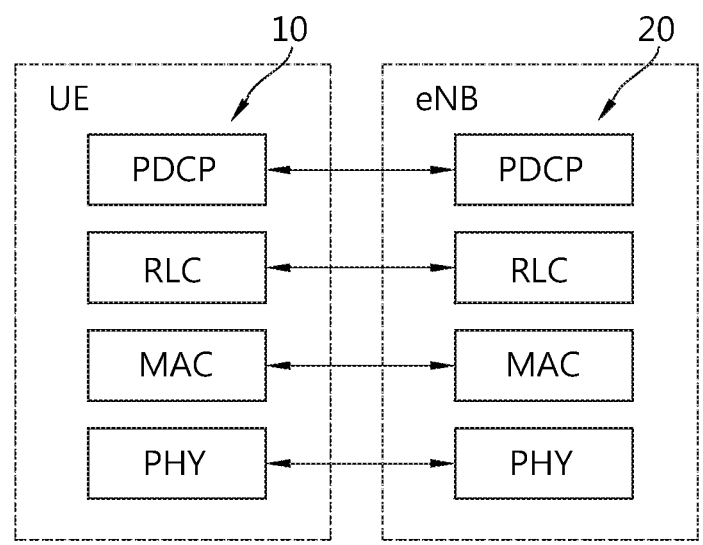
FIG. 3 shows a block diagram of a user plane protocol stack of an LTE system.
Figure 4:
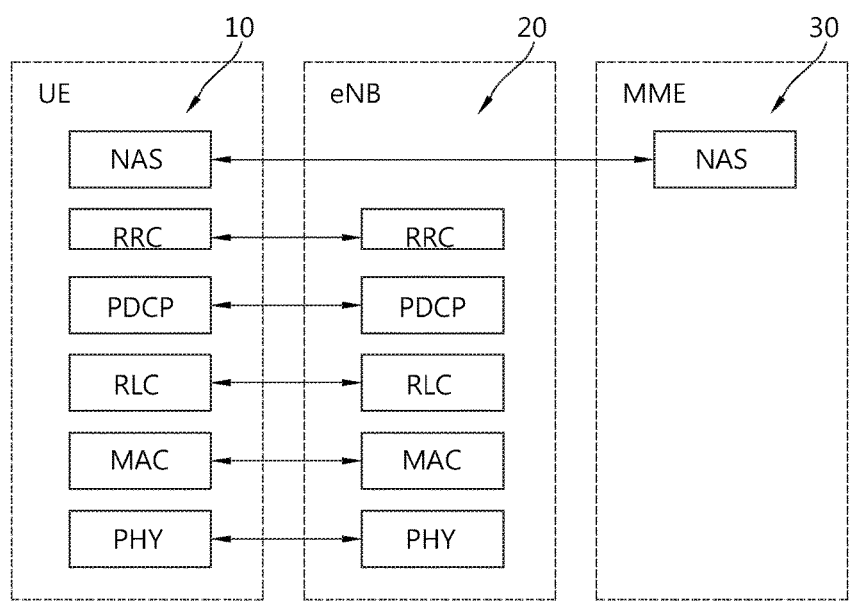
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
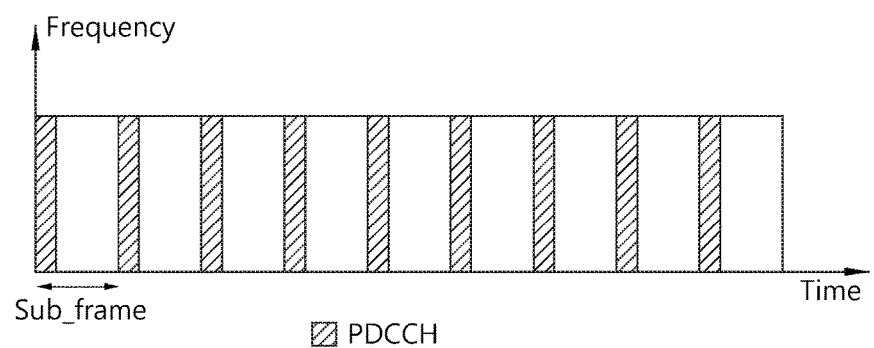
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Minimization of drive tests (MDT) is described. In may be referred to 3GPP TS 37.320 V11.3.0 (2013-03) and Section 5.6.6, 5.6.7 and 5.6.8 of 3GPP TS 36.331 V11.5.0 (2013-09). The general principles and requirements guiding the definition of functions for MDT are the following.

1. MDT mode: There are two modes for the MDT measurements, which are logged MDT and immediate MDT. The logged MDT is MDT functionality involving measurement logging by the UE in IDLE mode, CELL_PCH and URA_PCH states (when the UE is in UTRA) for reporting to eNB/radio network controller (RNC) at a later point in time. The immediate MDT is MDT functionality involving measurements performed by the UE in CONNECTED state and reporting of the measurements to eNB/RNC available at the time of reporting condition as well as measurements by the network for MDT purposes. There are also cases of measurement collection not specified as either immediate or logged MDT, such as accessibility measurements.

2. UE measurement configuration: It is possible to configure MDT measurements for the UE logging purpose independently from the network configurations for normal radio resource management (RRM) purposes. However, in most cases, the availability of measurement results is conditionally dependent on the UE RRM configuration.

3. UE measurement collection and reporting: UE MDT measurement logs consist of multiple events and measurements taken over time. The time interval for measurement collection and reporting is decoupled in order to limit the impact on the UE battery consumption and network signaling load.

4. Geographical scope of measurement logging: It is possible to configure the geographical area where the defined set of measurements shall be collected.

5. Location information: The measurements shall be linked to available location information and/or other information or measurements that can be used to derive location information.

6. Time information: The measurements in measurement logs shall be linked to a time stamp.

7. UE capability information: The network may use UE capabilities to select terminals for MDT measurements.

8. Dependency on self-optimizing network (SON): The solutions for MDT are able to work independently from SON support in the network. Relation between measurements/solution for MDT and UE side SON functions shall be established in a way that re-use of functions is achieved where possible.

9. Dependency on TRACE: The subscriber/cell trace functionality is reused and extended to support MDT. If the MDT is initiated toward to a specific UE (e.g., based on international mobile subscriber identity (IMSI), international mobile station equipment identity (IMEI) software version (SV), etc.), the signaling based trace procedure is used, otherwise the management based trace procedure (or cell traffic trace procedure) is used.

The solutions for MDT shall take into account the following constraints:

1. UE measurements: The UE measurement logging mechanism is an optional feature. In order to limit the impact on UE power consumption and processing, the UE measurement logging should as much as possible rely on the measurements that are available in the UE according to radio resource management enforced by the access network.

2. Location information: The availability of location information is subject to UE capability and/or UE implementation. Solutions requiring location information shall take into account power consumption of the UE due to the need to run its positioning components.

Logged MDT procedure is described. Support of logged MDT complies with the principles for idle mode measurements in the UE. Furthermore, measurement logging is differentiated based on UE states in idle mode, i.e. camped normally, any cell selection or camped on any cell. The UE shall perform measurement logging in "camped normally" state. In "any cell selection" and "camped on any cell" state the UE is not required to perform MDT measurement logging (including time and location information). For logged MDT, the configuration, measurement collection and reporting of the concerning measurement will always be done in cells of the same RAT type.

Figure 6:
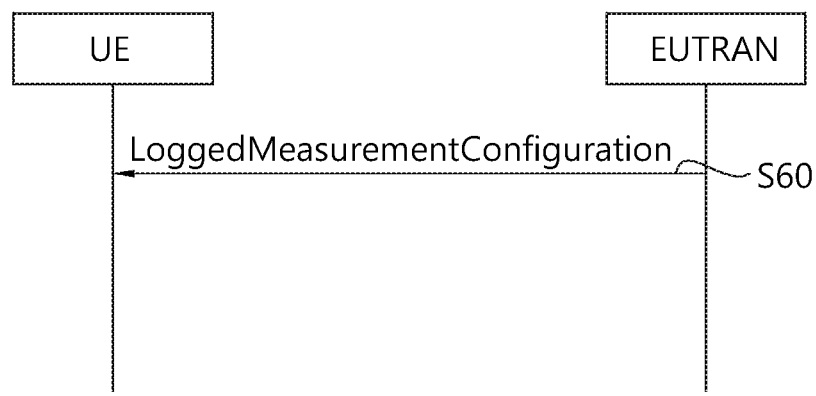
FIG. 6 shows a logged measurement configuration procedure.

FIG. 6 shows a logged measurement configuration procedure. The purpose of this procedure is to configure the UE to perform logging of measurement results while in RRC_IDLE. The procedure applies to logged measurements capable UEs that are in RRC_CONNECTED. The E-UTRAN may retrieve stored logged measurement information by means of the UE information procedure.

In step S60, the E-UTRAN initiates the logged measurement configuration procedure to the UE in RRC_CONNECTED by sending the LoggedMeasurementConfiguration message, which is used to transfer configuration parameters for logged MDT. This is a unidirectional RRC signaling procedure. A release operation for logged measurement configuration in the UE is realized only by configuration replacement when the configuration is overwritten or by configuration clearance in case a duration timer stopping or expiration condition is met.

Upon receiving the LoggedMeasurementConfiguration message, the UE shall:

1> discard the logged measurement configuration as well as the logged measurement information;

1> store the received loggingDuration, loggingInterval and areaConfiguration, if included, in VarLogMeasConfig;

1> if the LoggedMeasurementConfiguration message includes plmn-IdentityList;

2> set plmn-IdentityList in VarLogMeasReport to include the registered PLMN (RPLMN) as well as the PLMNs included in plmn-IdentityList;

1> else:

2> set plmn-IdentityList in VarLogMeasReport to include the RPLMN;

1> store the received absoluteTimeInfo, traceReference, traceRecordingSessionRef and tce-Id in VarLogMeasReport;

1> start timer T330 with the timer value set to the loggingDuration;

Upon expiry of T330, the UE shall:

1> release VarLogMeasConfig;

The UE is allowed to discard stored logged measurements, i.e. to release VarLogMeasReport 48 hours after T330 expiry.

Release of logged measurement configuration procedure may release the logged measurement configuration as well as the logged measurement information. The UE shall initiate the procedure upon receiving a logged measurement configuration in another RAT. The UE shall also initiate the procedure upon power off or detach. The UE shall:

1> stop timer T330, if running;

1> if stored, discard the logged measurement configuration as well as the logged measurement information, i.e. release the UE variables VarLogMeasConfig and VarLogMeasReport;

Measurements logging procedure specifies the logging of available measurements by a UE in RRC_IDLE that has a logged measurement configuration. While T330 is running, the UE shall:

1> perform the logging in accordance with the following:

2> if the UE is camping normally on an E-UTRA cell and if the RPLMN is included in plmn-IdentityList stored in VarLogMeasReport and, if the cell is part of the area indicated by areaConfiguration if configured in VarLogMeasConfig:

3> perform the logging at regular time intervals, as defined by the loggingInterval in VarLogMeasConfig;

2> when adding a logged measurement entry in VarLogMeasReport, include the fields in accordance with the following:

3> set the relativeTimeStamp to indicate the elapsed time since the moment at which the logged measurement configuration was received;

3> if detailed location information became available during the last logging interval, set the content of the locationInfo as follows:

4> include the locationCoordinates;
4> if available, include the uncertainty;
4> if available, include the confidence;

3> set the servCellIdentity to indicate global cell identity of the cell the UE is camping on;

3> set the measResultServCell to include the quantities of the cell the UE is camping on;

3> if available, set the measResultNeighCells, in order of decreasing ranking-criterion as used for cell re-selection, to include neighbouring cell measurements that became available during the last logging interval for at most the following number of neighbouring cells; 6 intra-frequency and 3 inter-frequency neighbours per frequency as well as 3 inter-RAT neighbours, per frequency/set of frequencies (GERAN) per RAT;

The UE includes the latest results of the available measurements as used for cell reselection evaluation.

2> when the memory reserved for the logged measurement information becomes full, stop timer T330 and perform the same actions as performed upon expiry of T330;

MBMS is described. It may be referred to Section 15 of 3GPP TS 36.300 V11.7.0 (2013-09).

Figure 7:
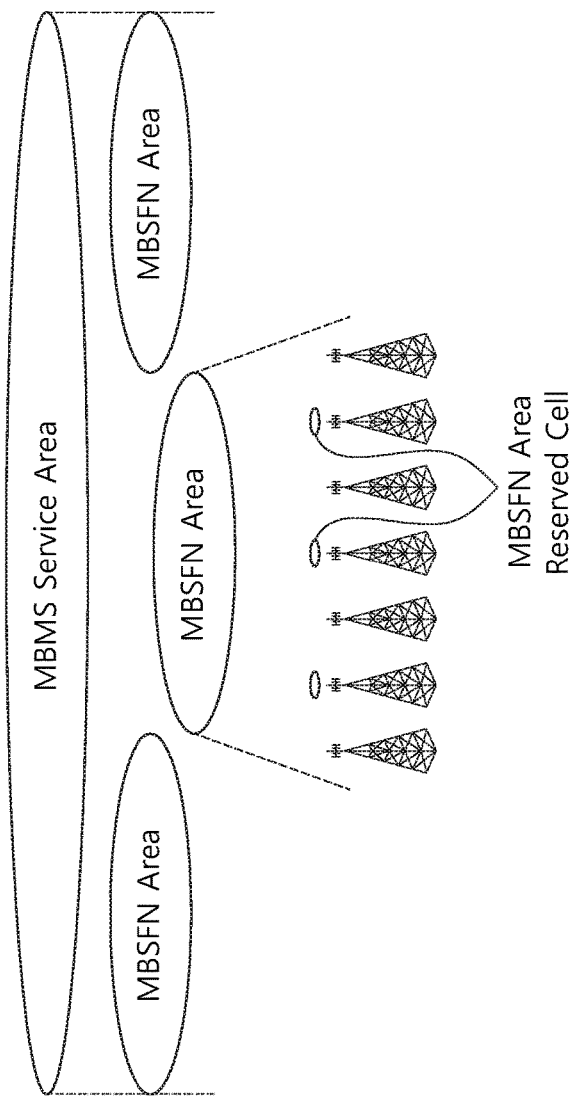
FIG. 7 shows MBMS definitions.

FIG. 7 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Logged MDT procedure may be performed for MBMS. Hereinafter, the logged MDT procedure for MBMS may be referred to as MBMS MDT. For MBMS MDT purpose, the UE measures, logs and reports followings:

MBSFN reference signal received power (RSRP)/reference signal received quality (RSRQ) per MBSFN area, and MCH block error rate (BLER) per MCS, per MCH, and per MBSFN area.

The UE is only required to perform and report MBMS measurements in subframes and on carriers where the UE is receiving physical multicast channel (PMCH).

For MBMS MDT, the logged measurement configuration procedure for described in FIG. 6 may be performed in order to log of measurement results for MBSFN in both RRC_IDLE and RRC_CONNECTED. Further, for MBMS MDT, the measurements logging procedure specifies the logging of available measurements by a UE in RRC_IDLE that has a logged measurement configuration and the logging of available measurements by a UE in both RRC_IDLE and RRC_CONNECTED if targetMBSFN-AreaList is included in VarLogMeasConfig. For MBSFN areas from which the UE is receiving MBMS service, the UE may perform MBSFN measurements, and perform logging at regular time intervals, but only for those intervals for which MBSFN measurement results are available.

For legacy logged MDT and unicast MDT, the UE may inform the serving cell whether it has logged measurement results via the RRC connection setup complete message, RRC connection reconfiguration complete message or RRC connection reestablishment complete message. If the network receives a message including the logged measurement available indicator, i.e. logMeasAvailable, which is set to true, the network may retrieve the logged measurement results via UE information procedure. That is, the UE logs measurement results in RRC_IDLE, and when the UE is in RRC_CONNECTED and has logged measurement results, the UE reports the logged measurement results to the network.

For MBMS MDT, the UE may indicate logged MBMS measurement availability at every handover procedure or at every RRC connection re-establishment procedure. As a response to the logged MBMS measurement available indicator, the eNB may usually request the retrieval of the logged MBMS measurement results to the UE, if any exceptional case such as congestion does not happen. For MBMS MDT, since MBMS measurement results are logged when the UE is in both RRC_IDLE and RRC_CONNECTED, the retrieval of the logged MBMS measurement results may occur more frequent than the retrieval of the logged measurement results in RRC_IDLE. This is because even though the UE reports the logged MBMS measurement results once, the UE may continue to log during RRC_CONNECTED, and keep reporting the newly logged MBMS measurement results. Since the logged MBMS measurement results are not required to be reported to the network urgently, the frequent retrieval of the logged MBMS measurement results may cause unnecessary signaling overhead.

In order to solve the problem described above, a method for indicating logged MBMS measurement availability according to an embodiment of the present invention is described below. According to an embodiment of the present invention, when the UE decides whether to inform the serving cell that it has logged MBMS measurement results to be reported, if the UE has logged MBMS measurement results available for E-UTRA, and further, if an additional condition related to MBMS MDT is met, the UE informs the serving cell that it has logged MBMS measurement results to be reported. The additional condition related to MBMS MDT may include at least one of followings.

If the UE is not receiving an MBMS via MBSFN transmission, or

If the memory reserved for MBMS MDT is full, or

If the number of entries of logged MBMS measurement results is higher than threshold A, or If the size of stored logged MBMS measurement results exceeds a threshold B, or If the MBMS MDT timer is not running, or If the available indicator prohibit timer is not running.

In summary, only when the logged MBMS measurement results has to be reported, or only when the MBMS measurement results cannot be logged, or only when the MBMS measurement results does not need to be logged, or only when the MBMS MDT related timer is not running, the UE informs the serving cell that it has logged MBMS measurement results to be reported. Otherwise, the UE does not inform the serving cell that it has the logged MBMS measurement results to be reported. Or, the UE may inform the serving cell that it does not have the logged MBMS measurement results to be reported.

Figure 8:
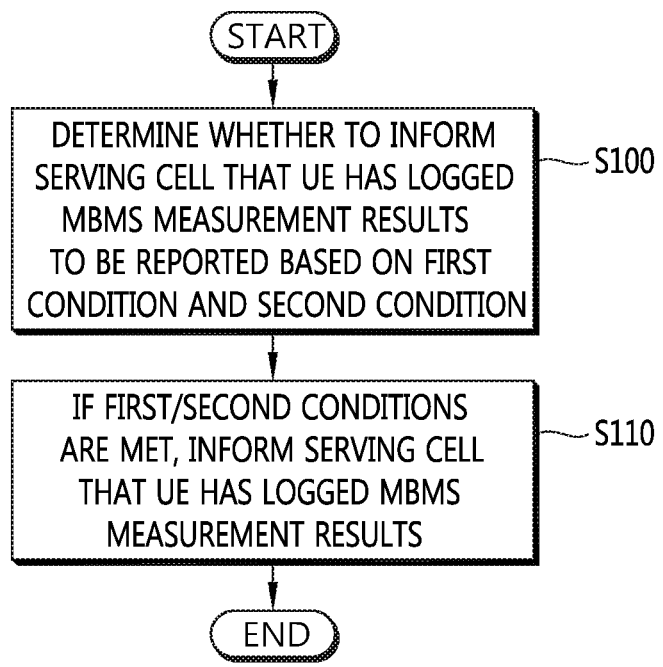
FIG. 8 shows an example of a method for indicating a logged MBMS measurement availability according to an embodiment of the present invention.

FIG. 8 shows an example of a method for indicating a logged MBMS measurement availability according to an embodiment of the present invention.

In step S100, the UE determines whether to inform the serving cell that the UE has logged MBMS measurement results to be reported based on a first condition and a second condition. The first corresponds to that the UE has logged MBMS measurement results to be reported. The second condition includes at least one MBMS MDT related condition. That is, the second condition may include at least one of that if the UE is not receiving MBMS via MBSFN transmission, if the memory for logged MBMS measurement results is full, if a number of entries of logged MBMS measurement results is higher than a first threshold, if the size of logged MBMS measurement results exceeds a second threshold, if a MBMS MDT timer is not running, or if an available indicator prohibit timer is not running. One entry of logged MBMS measurement results may include MBSFN RSRP/RSRQ per MBSFN area, MCH BLER per MCS, per MCH, and per MBSFN area, and RSRP/RSRQ of serving cell and neighbor cells on a serving frequency. Further, the first threshold and the second threshold may be configured by the network with the MBMS MDT configuration. The MBMS MDT configuration may include at least one of a MBSFN area identity(s) to be measured, or a carrier frequency of the MBSFN area.

In step S110, only when both the first condition and the second condition are met, the UE informs the serving cell that the UE has logged MBMS measurement results. The UE may inform the serving cell whether it has logged MBMS measurement results to be reported by transmitting the MBMS MDT available indicator. The UE may set the MBMS MDT available indicator to 'TRUE' when the UE informs the serving cell that it has logged MBMS measurement results to be reported. The UE may set the MBMS MDT available indicator to 'FALSE' when the UE informs the serving cell that it does not have logged MBMS measurement results to be reported. Alternatively, the UE may transmit the MBMS MDT available indicator only when the UE informs the serving cell that it has logged MBMS measurement results to be reported. The MBMS MDT indicator may be transmitted via one of following RRC messages, i.e. RRC connection setup complete message, RRC connection reconfiguration complete message, or RRC connection reestablishment complete message. Or, indicating the logged MBMS measurement availability via the RRC connection reconfiguration complete message may be prohibited. In this case, the UE does not include the MBMS MDT available indicator to the RRC connection reconfiguration complete message. In other words, the UE may be allowed to indicate the logged MBMS measurement availability only via the RRC connection setup complete message or RRC connection reconfiguration complete message.

If the network receives the MBMS MDT available indicator which may be set to 'TRUE' from the UE, the network may initiate UE information procedure to retrieve the logged MBMS measurement results from the UE.

Upon informing the serving cell that the UE has logged MBMS measurement results, the UE may start the available indicator prohibit timer. While the available indicator prohibit timer is running, the UE cannot inform the serving cell that the UE has logged MBMS measurement results. The UE may stop the available indicator prohibit timer when the memory reserved for the logged MBMS measurement results becomes full.

Further, the UE may start the MBMS MDT timer, upon receiving the MBMS MDT configuration from the serving cell, or when starts to receive an MBMS provided from an MBSFN area which was configured to be measured. While the MBMS MDT is running, the UE may log the MBMS measurement results. The UE may stop the MBMS MDT timer when the memory reserved for the logged MBMS measurement results becomes full. Upon expiry of the MBMS MDT timer, the UE may release the MBMS MDT configuration. The UE may be allowed to discard stored logged MBMS measurement results 48 hours after the MBMS MDT timer expires.

Figure 9:
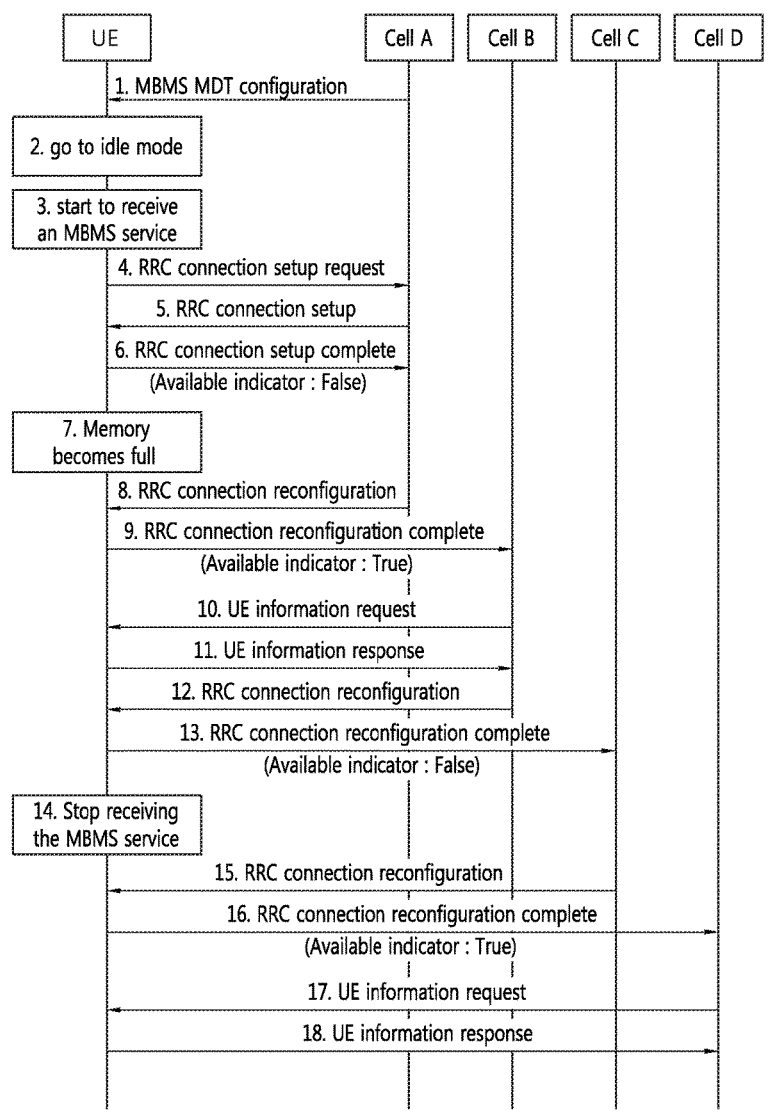
FIG. 9 shows another example of a method for indicating a logged MBMS measurement availability according to an embodiment of the present invention.

FIG. 9 shows another example of a method for indicating a logged MBMS measurement availability according to an embodiment of the present invention.

1. The UE in RRC_CONNECTED receives the MBMS MDT configuration from a serving cell, i.e. cell A. It is assumed that the UE is not receiving any MBMS service.

2. The UE transmits to RRC_IDLE.

3. The UE starts to receive an MBMS service via MBSFN transmission. It is assumed that he MBMS service is provided in MBSFN area A, and the MBSFN area A was configured to be measured. So, the UE starts to perform MBMS MDT.

4. The UE transmits the RRC connection setup request message to the cell A.

5. The UE receives RRC connection setup message from the cell A.

6. The UE transmits the RRC connection setup complete message including MBMS MDT available indicator to the cell A. It is assumed that the UE is still receiving the MBMS service, and has some logged MBMS measurement results. But, it is further assumed that the memory reserved for the logged MBMS measurement results is not full. Therefore, the UE sets the MBMS MDT available indictor in the RRC connection setup complete message to 'FALSE'.

7. The memory reserved for the logged MBMS measurement information becomes full.

8. The UE receives the handover command message, which is the RRC connection reconfiguration message including mobility information, for handover from the cell A to the cell B.

9. The UE transmits the handover complete message, which is the RRC connection reconfiguration complete message, including the MBMS MDT available indicator to the cell B. Since the memory reserved for the logged MBMS measurement information becomes full, the UE sets the MBSM MDT available indictor in the handover complete message to 'TRUE'.

10. The cell B transmits the UE information request message to the UE to retrieve logged MBMS measurement results.

11. The UE reports logged MBMS measurement results to the cell B via the UE information response message. After reporting logged MBMS measurement results, the UE discard logged MBMS measurement results and keep performing MBMS MDT.

12. The UE receives the handover command message, which is the RRC connection reconfiguration message including mobility information, for handover from the cell B to the cell C.

13. The UE transmits the handover complete message, which is the RRC connection reconfiguration complete message, including the MBMS MDT available indicator to the cell C. The UE has some logged MBMS measurement results. But, since the memory reserved for the logged MBMS measurement information is not full, the UE sets the MBSM MDT available indictor in the handover complete message to 'FALSE'.

14. The UE stops to receive the MBMS service, and also stops performing MBMS MDT.

15. The UE receives the handover command message, which is the RRC connection reconfiguration message including mobility information, for handover from the cell C to the cell D.

16. The UE transmits the handover complete message, which is the RRC connection reconfiguration complete message, including the MBMS MDT available indicator to the cell D. Since the memory reserved for the logged MBMS measurement information is not full but the UE is not receiving any MBMS service, the UE sets the MBSM MDT available indictor in the handover complete message to 'TRUE'.

17. The cell D transmits the UE information request message to the UE to retrieve logged MBMS measurement results.

18. The UE reports logged MBMS measurement results to the cell D via the UE information response message. After reporting logged MBMS measurement results, the UE discard logged MBMS measurement results and keep performing MBMS MDT.

Figure 10:
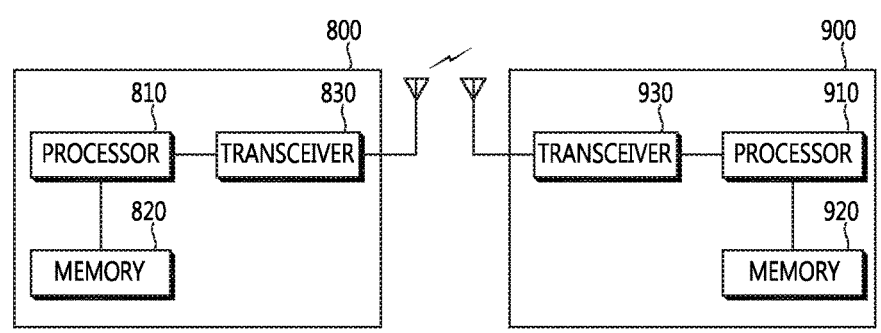
FIG. 10 shows a wireless communication system to implement an embodiment of the present invention.

FIG. 10 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A communication method for a user equipment (UE) in a wireless communication system, the method comprising:
 receiving an multimedia broadcast multicast service (MBMS) service via multicast-broadcast single-frequency network (MBSFN) transmission;
 performing MBMS minimization of drive tests (MDT) for the MBMS service; and
 when both a first condition and a second condition are met, informing a serving cell that the UE has logged MBMS measurement results,
 wherein the first condition is related to the UE having the logged MBMS measurement results, and
 wherein the second condition includes at least one of:
  if the UE stops reception of the MBMS service, or
  if a number of entries of the logged MBMS measurement results is higher than a first threshold, the first threshold being configured by the serving cell.

2. The method of claim 1, wherein an entry of the logged MBMS measurement results includes:
 a MBSFN reference signal received power (RSRP) or reference signal received quality (RSRQ) per MBSFN area, a multicast channel (MCH) block error rate (BLER) per modulation and coding scheme (MCS), per MCH, or per MBSFN area, and a RSRP or a RSRQ of the serving cell or neighbor cells on a serving frequency.

3. The method of claim 1, wherein the informing the serving cell that the UE has the logged MBMS measurement results comprises:

transmitting a MBMS MDT available indicator.

4. The method of claim 3, wherein the MBMS MDT available indicator is set to 'TRUE'.

5. The method of claim 3, wherein the MBMS MDT available indicator is transmitted via one of a radio resource control (RRC) connection setup complete message, a RRC connection reconfiguration complete message, or a RRC connection reestablishment complete message.

6. The method of claim 1, further comprising reporting the logged MBMS measurement results to the serving cell via a UE information response message.

7. The method of claim 1, further comprising, upon informing the serving cell that the UE has the logged MBMS measurement results, starting an available indicator prohibit timer.

8. The method of claim 7, further comprising stopping the available indicator prohibit timer when a memory reserved for the logged MBMS measurement results becomes full.

9. The method of claim 1, further comprising:

starting a MBMS MDT timer, upon receiving a MBMS MDT configuration from the serving cell, or starting to receive an MBMS provided from an MBSFN area which was configured to be measured.

10. The method of claim 9, further comprising stopping the MBMS MDT timer when a memory reserved for the logged MBMS measurement results becomes full.

11. The method of claim 9, further comprising, upon expiry of the MBMS MDT timer, releasing the MBMS MDT configuration.

12. A user equipment (UE) comprising:

a memory;

a transceiver; and a processor coupled to the memory and the transceiver, and configured to:

receive an multimedia broadcast multicast service (MBMS) service via multicast-broadcast single-frequency network (MBSFN) transmission;

perform MBMS minimization of drive tests (MDT) for the MBMS service; and when both a first condition and a second condition are met, control the transceiver to inform a serving cell that the UE has logged MBMS measurement results to be reported, wherein the first condition is related to the UE having the logged MBMS measurement results, and wherein the second condition includes at least one of:

if the UE stops reception of the MBMS service, or if a number of entries of the logged MBMS measurement results is higher than a first threshold, the first threshold being configured by the serving cell.

* * * * *